No. 660,523. Patented Oct. 23, 1900.
J. WALKER.
GLAND PACKING.
(Application filed Apr. 25, 1900.)
(No Model.)
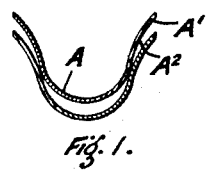
Fig. 1.
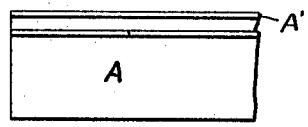
Fig. 2.
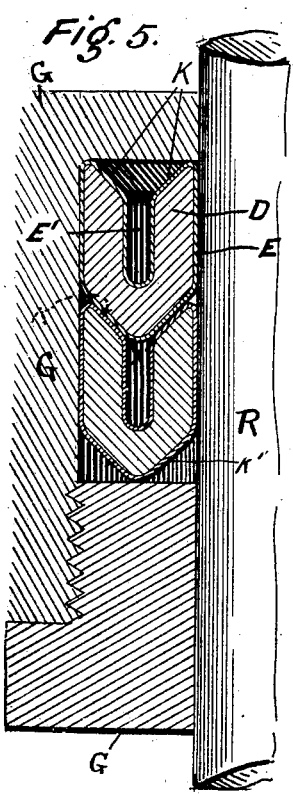
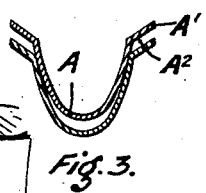
Fig. 3.
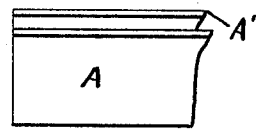
Fig. 4.
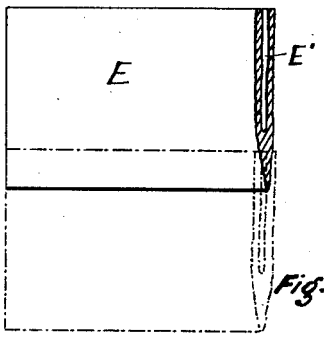
Fig. 6.
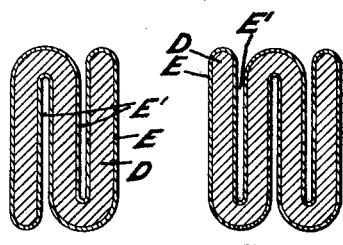
Fig. 7.
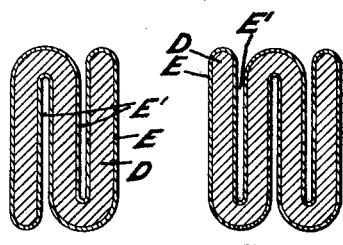
Fig. 8.
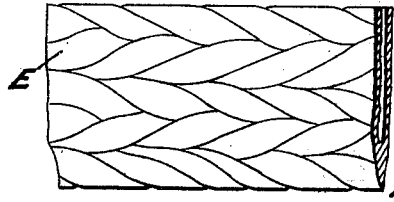
Fig. 9.
Witnesses:
Royce A. Russ,
L. C. Hills.
Inventor
James Walker
By R. S. C. Caldwell
Attorney.

UNITED STATES PATENT OFFICE.

JAMES WALKER, OF LONDON, ENGLAND.

GLAND-PACKING.

SPECIFICATION forming part of Letters Patent No. 660,523, dated October 23, 1900.

Application filed April 25, 1900. Serial No. 14,365. (No model.)

*To all whom it may concern:*

Be it known that I, JAMES WALKER, a citizen of Great Britain, and a resident of Poplar, London, E., England, have invented certain new and useful Improvements in and Relating to Gland-Packings, (for which I have applied for patent in Great Britain, No. 19,131, dated September 22, 1899,) of which the following is a specification.

This invention relates to the manufacture of gland-packings, and has for its object to produce a packing which while occasioning the minimum of friction in use will be capable of being tightly and effectively forced to its work by fluid-pressure and so as to occasion no leakage of fluid.

The invention is applicable for any kind of packing-glands or stuffing-boxes for steam, water, air, gas, or other fluids.

The invention consists in providing the packing of hollow or substantially cup or V-shaped cross-section, so that by the pressure-space thus formed and the surface thereby afforded for the application of fluid-pressure and for the wedge action of the superposed rings or layers a fluid-tight joint is secured, and any irregularities in the diameter of the rod or box are made good.

The invention also consists in providing packing from metal turnings or shavings with a cover or envelop that permits of rings or layers being formed to the required section and that allows of the rings or layers being wholly withdrawn from the gland or box in the case of renewal.

The invention is illustrated in the accompanying drawings, in which—

Figures 1 and 2 are respectively a section and an elevation of packing constructed according to my invention. Figs. 3 and 4 are a section and an elevation of a modified form thereof. Fig. 5 is a section through another modification shown in position in the packing-gland. Fig. 6 is an elevation of this form of packing. Figs. 7 and 8 are sections of further modifications. Fig. 9 is an elevation of one form of packing having a plaited covering.

In carrying the invention into effect the packing may be produced from sheet metal stamped or otherwise formed in rings of substantially cup or V section, as illustrated in Figs. 1 to 4. The rings A are placed one upon the other in any desired number, the upper edges A' making contact, respectively, with the rod and gland, thereby forming a U-spring. These rings A may be cut in halves or segments for the purpose of convenient application upon the rod or within the gland, the joints of the halves or segments being broken with every alternate layer. By such a formation of the rings spaces $A^2$ are formed, wherein fluid-pressure may act to form a tight joint by forcing the upper edges A' firmly against the rod and gland.

As illustrated in Figs. 5 and 6, the packing may be of any suitable filing D, of metal turnings or shavings or the like, incased in a woven cover or envelop E of any desired material, such as wire, asbestos, or cotton cloth, or a combination of metallic wire and fiber or other suitable material for the purpose of retaining the filing in shape. The cover or envelop may be woven in the form of a tube and filled with the turnings or shavings and pressed up to the desired shape and size. I prefer the U shape illustrated in Fig. 5, having the central fluid-pressure space E' and with the upper edges K' formed inclined and flaring and the lower edge K' formed angular and tapering in order that the angular lower edge of one strip may fit within and wedge apart the upper flaring edges of the next strip when pressure is brought to bear thereon. I also prefer to employ as a filler turnings or shavings of soft metal, such as an alloy of lead and tin. However, any other suitable filling may be employed—such as asbestos, rubber, or graphite, with or without metal turnings or shavings.

No limitation is placed to the actual shape of the rings, which may, for example, be formed N or W shape in cross-section, as shown in Figs. 7 and 8, respectively.

Instead of the cover or envelop E being formed of woven wire or fiber it may be plaited, as illustrated in Fig. 9, or lubricating metal or wire shaving may be introduced in the manufacture of the cover.

From the foregoing it is obvious that a packing composed of a number of layers or strips of U-packing telescoped one within the other is most efficient, for as the steam or other fluid attempts to pass through the gland it first enters the pressure-space E' of the first ring and forces the edges of that ring against the rod R and gland G, giving the entire ring a slight outward movement, and thereby forcing out the edges of the ring therebeneath by wedge action, so that the steam-pressure is exerted upon a number of the layers at their outwardly-projecting edges and at the same time there is a progressive wedge action from the first layer outwardly, with the result that a perfect joint is secured.

Having fully described my invention in detail, what I claim as new, and desire to secure by Letters Patent, is—

1. A packing consisting of a number of rings, each ring being substantially cup shape in cross-section with a free central opening forming a fluid-pressure space, said rings being superposed so that the bottom of one wedges within the pressure-space of the next to force its top edges apart and into contact with the stationary and moving bodies respectively, substantially as described.

2. A packing consisting of a number of rings substantially cup shape in cross-section with a free central opening forming a fluid-pressure space, each ring having an angular bottom edge and flaring top edges, said rings being superposed so that the bottom angular edge of one wedges within the flaring top edges of the next to force its top flaring edges apart and into contact with the stationary and moving bodies respectively, substantially as described.

3. A packing consisting of a number of rings substantially cup shape in cross-section with a free central opening forming a fluid-pressure space, each ring comprising a filler contained within a casing and shaped to form an angular bottom edge and flaring top edges, said rings being superposed so that the bottom angular edge of one wedges within the flaring top edges of the next to force said top edges apart and into contact with the stationary and moving bodies respectively, substantially as described.

In witness whereof I have hereunto set my hand in presence of two witnesses.

JAMES WALKER.

Witnesses:
WILLIAM EDWARD EVANS,
ANTON PAULI.